July 11, 1967

V. E. STRAUGHAN ETAL 3,331,044

TEMPERATURE SENSOR

Filed Nov. 27, 1964

INVENTORS
VIRGIL E. STRAUGHAN
ROBERT E. BENDIS
JULES MAGDER

BY Lawrence J. Fealo

ATTORNEY

United States Patent Office 3,331,044
Patented July 11, 1967

3,331,044
TEMPERATURE SENSOR
Virgil E. Straughan, Euclid, and Robert E. Bendis, Cleveland, Ohio, and Jules Magder, Baltimore, Md., assignors to Horizons Incorporated, a corporation of New Jersey
Filed Nov. 27, 1964, Ser. No. 414,257
12 Claims. (Cl. 338—25)

This invention relates to the sensing of temperatures. More particularly, it relates to materials useful in the indication of temperatures and to devices such as thermostatic switches embodying such materials.

Many situations exist in which an increase in the ambient temperature above some value can have serious, dangerous or merely undesirable consequences. A simple instance is in the storage of foods under refrigeration. Another is in the storage of explosives, paints, solvents or other flammable materials aboard naval vessels. Still others include the avoidance of overheating of sensitive electronic equiment, e.g. in missile hangars or in guidance systems. Whatever the environment, the use of mercury in glass (thermometer) thermoswitches is less than ideal, especially when the switch is likely to be exposed to shock or breakage. Furthermore, with many thermometers there is a real danger of toxic effects on personnel if the thermometer breaks.

As a consequence a wide variety of materials have been proposed as substitutes for presently known thermostatic switches, but many of these are subject to variations due to fumes, humidity and other variables.

A principal object of this invention is to provide a small, inexpensive novel thermostatic switch having no moving parts which functions at a specific predetermined temperature, at which it experiences a change in electrical conductivity of at least a factor of 100, over a change of not more than 5° C.

Another object of the invention is to improve the resettability of the novel materials, whereby the switch may be repeatedly reused.

Briefly the material utilized in the present compositions comprises an ionic substance which is only slightly electrically conductive as a solid but which exhibits substantial electrical conductivity on melting, probably due to a relatively large increase in ionic mobility upon melting. A particularly preferred class of materials are hydrated salts in which the melting process involves the dissolution of the salt in its own liberated water of crystallization. Under ideal conditions, the change in electrical conductivity of stable hydrated salts is expected to be completely reversible for cycles of melting and resolidification, provided that no water or other volatile constituent is lost to, or absorbed from, the atmosphere. In practice it is found necessary to enclose the thermostatic switch material in a vapor barrier type cell to avoid permanent loss of water or pickup of excessive water from the atmosphere. Both metals and plastics are suitable for this purpose.

One class of inorganic salts which melt at temperatures of commercial interest comprise the alums which are hydrated salts of the general formula $$X_2SO_4 \cdot Y_2(SO_4)_3 \cdot 24H_2O$$

wherein X represents a monovalent species such as the alkali metals and $NH_4$ and Y represents a trivalent metal such as Al, $Cr^{+3}$ and $Fe^{+3}$.

In general it was found that the alums as a class exhibited an enormous resistance drop upon melting as evidenced by resistance changes of from 3 to 5 orders of magnitude, a change which was generally larger than that experienced by other hydrated metal salts, on melting. Unfortunately the alums do not resolidify as promptly as is required in a practical device which is to be recycled repeatedly.

Other compounds which exhibit this phenomenon include, but are not limited to, the following:

TABLE I

| | Melting Point (° C.) | Sharp Change in Resistance (° C.) |
|---|---|---|
| Potassium fluoride, $KF \cdot 2H_2O$ | 41 | 41 |
| Cobalt chloride, $CoCl_2 \cdot 6H_2O$ | 86 | 52 |
| Cobalt bromide, $CoBr_2 \cdot 6H_2O$ | 47 | 41 |
| Nickel nitrate, $Ni(NO_3)_2 \cdot 6H_2O$ | 50 | |
| Ferrous sulfate, $FeSO_4 \cdot 7H_2O$ | 63 | |
| Aluminum nitrate, $Al(NO_3)_3 \cdot 9H_2O$ | 70 | |

As regards the melting points of these materials, the apparent melting point and the temperature at which the compound's resistance drops substantially are found to be different in some instances. For example, cobaltous chloride hydrate with a published M.P. of 86° C. "triggers" at 52° C. or approximately 126° F. cobaltous bromide hydrate "triggers" at 41° C. which is 6° C. below its published melting point. It is possible that prior to total disappearance of the solid phase sufficient water of crystallization is liberated to provide a sufficient amount of ionized solution for the observed decrease in resistance.

Of the many hydrated salts known, those listed above have been found to exhibit the sharp increase in conductivity required for a practical utilization of this well known phenomenon, but even these salts cannot be recycled over short periods without the addition of an agent which speeds up the resolidification process and makes possible the practical application of the materials noted.

In the present invention, it has been found that in order to impart resettability to such materials in thermostatic switches another substance must be added to the thermosensitive compound in order that it may be reused in practical embodiments. Of course, in single-use devices no such additive is required and a much more extensive group of materials might be utilized in single-use devices than the seven hydrated salts listed above.

The material which is added to facilitate resolidification must be a material which is not soluble to any appreciable extent in the molten salt or in its aqueous solution in order to effect the desired result. For the metal salts listed above, both alumina and titania have been found quite satisfactory and many other materials exist which are suitable for these or other salts. The addition of 50% by weight of such a material to $KF \cdot 2H_2O$ made this material useful in a practical thermostatic switch.

The addition of a desiccant to the meltable hydrated metal salt to take up excess occluded water has been found to further improve the operation of the thermostatic switch material. $CaSO_4$ (anhydrous) which had been dried in an oven at 180° C. for 24 hours was found to be a particularly preferred desiccant in the practice of the present invention, but other substances of a similar nature or mixtures of such substances may be used in the compositions of this invention. In some instances the same material is used to facilitate resolidification and also as a desiccant.

The effectiveness of the desiccant can be illustrated in the case of cobaltous chloride. In previous attempts at using this compound even with $Al_2O_3$ as a nucleating agent, a minimum of 5 hours were required for "resetting." Resetting time was reduced to approximately 15 minutes when $CaSO_4$ was added. The time varied from cell to cell but all cells require at least 10 minutes and not more than 20 minutes.

In the evaluation of $CoCl_2 \cdot 6H_2O$ it was noted that there is a direct relationship between resistance and color. The PVC cell containing $CoCl_2 \cdot 6H_2O$ was rose red in its high resistance state and, upon proceeding to a lower resistance value, changed to a violet or blue-violet color. Investigators of this compound attribute the color change to levels of hydration. The compound $CoCl_2.6H_2O$ is rose red; $CoCl_2.4H_2O$ is red; and $CoCl_2.2H_2O$ is blue. Apparently any liberation of water will contribute to conduction.

The compositions found to give the best results had the following proportions by weight:

| | Percent |
|---|---|
| Thermosensitive compound (preferably any of the hydrated halide salts listed in Table I) | 37.5 |
| Nucleating agent (e.g. $TiO_2$ or $Al_2O_3$) | 37.5 |
| Dessicant (e.g. $CaSO_4$ anhydrous) | 25.0 |

In the present invention a range of proportions of 25–50% thermosensitive compound, up to 50% nucleating agent and up to 30% dessicant has been found to provide compositions exhibiting the desired properties, 25 to 50% nucleating agent being a preferred range.

Devices were constructed using compositions prepared from mixtures which had been dry ball-milled to insure thorough and complete mixing.

In the drawings accompanying this application:

Figure 1:
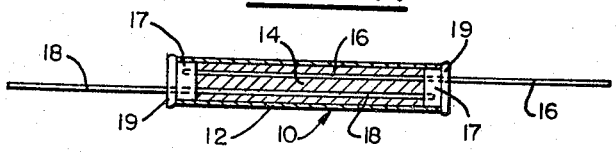
FIGURE 1 is a sectional view of one type of device utilizing a thermosensitive composition of the type described.

The device 10 shown in FIGURE 1 consists of a vapor impervious tube 12, one-eighth inch in diameter and three-quarter inch long, in which the thermosensitive composition 14 is encapsulated. Tubes of polyvinyl chloride or other inert and impermeable plastic are suitable. Electrodes 16 and 18 extend into the composition on parallel paths spaced .095" apart from opposite ends of tube 12. End plugs 17 seal the composition in the tube, plugs 17 being constructed of an electrically insulating epoxy resin. An outer disc 19 cemented to the tube 12 completes the encapsulation.

It will be understood that in single use devices the thermosensitive materials may be molded into a self-sustaining body or carried in a vessel open to the atmosphere, instead of being encapsulated in a vapor tight envelope as shown in the device of FIGURE 1.

Figure 2:
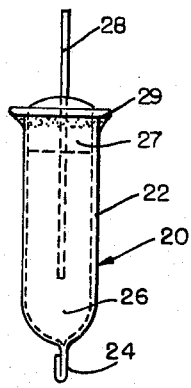
FIGURE 2 is a view of a second type of device utilizing a thermosensitive composition of the type described.

The device shown in FIGURE 2 consists of a 3/8" tubular shell 22, about one inch long and constructed of thin walled copper tubing open at one end and closed at the other end by a crimped seal 24 and filled with a body of thermosensitive material 26. An electrode 28 is embedded in the material 26 and extends out of the open end of tube 26. A glass to metal seal 29 closes the end of tube 22 and an insulating stopper or plug 27 may serve to space seal 29 from the thermosensitive material 26. Tube 22 acts as the second electrode in the cell of FIGURE 2, the first electrode 28 being preferably a tinned copper wire.

Figure 3:
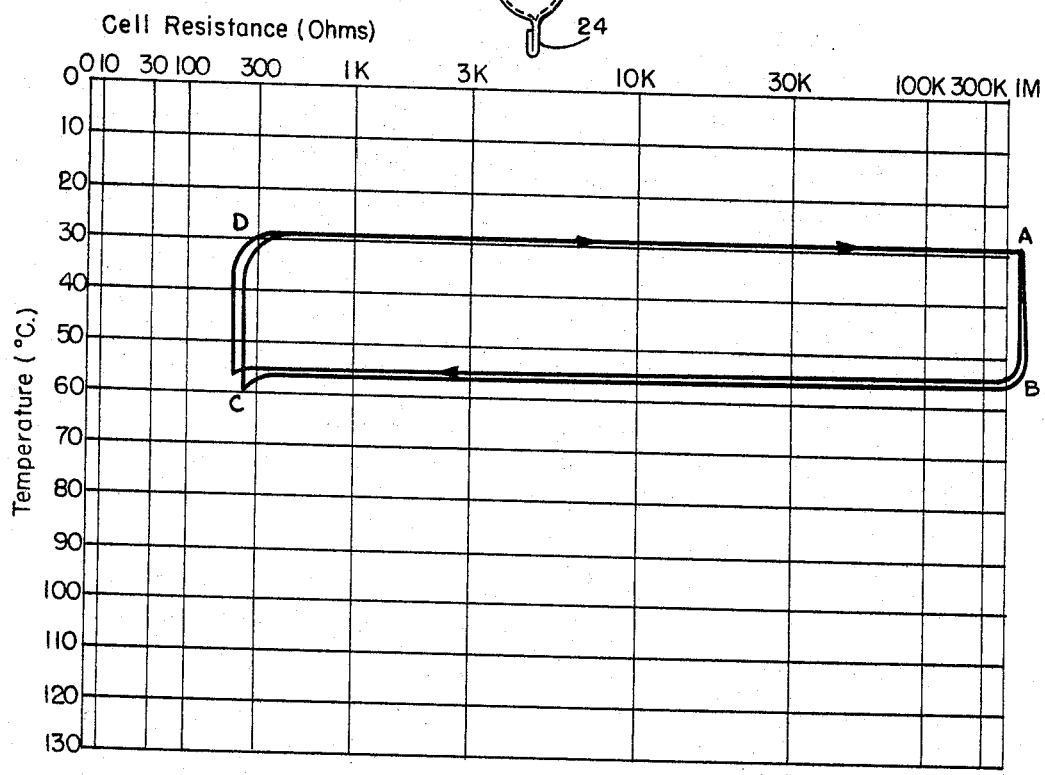
FIGURE 3 is a graphical presentation of the properties of the device constructed as in FIGURE 1.

FIGURE 3 is a graph on which the logarithm of the resistance plotted as a function of temperature for two devices constructed as in FIGURE 1, in which the thermosensitive composition 14 consisted of a mixture of 37.5% $CoCl_2.6H_2O$, 37.5% $Al_2O_3$ and 25% $CaSO_4$ (anhydrous), by weight.

It will be seen that a resistance change of over three orders of magnitude is shown for a 2 to 3° C. change in temperature. The cell resistance was measured by applying an alternating current voltage of 10 volts at a frequency of 4 kc. across the sample and determining the resultant current flow.

In the curves of FIGURE 3, a composition at a temperature of about 29° C. (Point A on the curves) is exposed to heat and increases in temperature along A–B of the graph, while the resistance or electrical conductivity of the composition remains substantially unchanged. In the temperature range of 51–55° C. the composition melts to a mushy mass and the cell resistance drops by several orders of magnitude, as evidenced by leg B–C of the graph. Thereafter as the composition is permitted to cool and to resolidify the temperature of the same decreases to a value sufficient for resolidification to be complete at which time the resistance returns to the initial value at point A.

It will be evident that the thermosensitive compositions of this invention provide reversible devices which experience a change in electrical conductivity of several orders of magnitude as they undergo a phase change from solid to liquid.

As mentioned before, although the melting point of $CoCl_2.6H_2O$ is recognized as 86° C., the initial decrease in resistance begins at 52° C. This compound exhibits a resistance change of four orders of magnitude in two degrees. One cell was tested through 25 cycles and was still functional. The temperature was raised as high as 103° C. without any increase in resetting time. A typical graph of resistance versus temperature is shown in the figure for two identical thermostatic switches prepared according to the above formulation. The melting point break is sharp if the cells are not cycled too rapidly, otherwise signs of fatigue are noted and the resistance change from 1M to 100K is not rapid. A sharp breaking curve can be achieved again by allowing the cells to stand at room temperature for about 20 minutes before the next cycle.

Cobalt bromide hydrate was found to function satisfactorily when additives were made to it similarly to the chloride. The switch composition is as follows:

| | Percent |
|---|---|
| $CoBr_2.6H_2O$ | 37.5 |
| $Al_2O_3$ | 37.5 |
| $CaSO_4$ | 25 |

Cobalt bromide provides an alternative to the $KF.2H_2O$ switch for a lower temperature range, triggering at approximately 41–42° C.

Having now described the invention it is not intended that it be limited except as may be required by the appended claims.

We claim:

1. A resettable thermosensitive device including in combination a mixture consisting essentially of between 25% and 50% by weight of at least one hydrated metal salt which experiences a very substantial change in electrical conductivity as it melts, admixed with up to 50% by weight of at least one nucleating agent and means to pass an electric current through said salt.

2. The device of claim 1 including in addition means to enclose said salt in a vapor tight envelope.

3. The device of claim 1 in which the hydrated metal salt is admixed with at least one dessicant before it is incorporated in said device.

4. A thermosensitive composition which experiences a large change in electrical conductivity in melting, said composition being an intimate admixture consisting essentially of between 25% and 50% by weight of at least one hydrated metal salt and up to 50% by weight of at least one nucleating agent for said salt.

5. A thermosensitive composition which experiences a large change in electrical conductivity in melting, said composition being an intimate admixture consisting essentially of between 25% and 50% by weight of at least one hydrated metal salt, up to 50% by weight of at least one nucleating agent for said salt, and up to 30% of at least one dessicant for said salt.

6. The composition of claim 5 there being 25% to 50% by weight of hydrated metal salt in said composition, 25 to 50% by weight of nucleating agent in said composition and up to 30% of dessicant in said composition.

7. The composition of claim 6 in which the hydrated metal salt is a hydrated metal halide selected from the group consisting of $KF \cdot 2H_2O$, $CoCl_2 \cdot 6H_2O$ and $CoBr_2 \cdot 6H_2O$.

8. The composition of claim 6 in which the hydrated metal salt is $KF \cdot 2H_2O$.

9. The composition of claim 6 in which the hydrated metal salt is $CoCl_2 \cdot 6H_2O$.

10. The composition of claim 6 in which the hydrated metal salt is $CoBr_2 \cdot 6H_2O$.

11. The composition of claim 6 there being 37.5% by weight of hydrated metal salt in said composition, 37.5% by weight of nucleating agent in said composition and 25% of dessicant in said composition.

12. The composition of claim 6 enclosed in an envelope.

References Cited

UNITED STATES PATENTS

| | | | |
|---|---|---|---|
| 2,627,570 | 2/1953 | Hall | 338—30 |
| 2,740,030 | 3/1956 | Quinn | 338—30 |
| 2,842,648 | 7/1958 | Reynolds | 338—26 |
| 2,945,196 | 7/1960 | Shanley | 338—28 |
| 3,017,592 | 1/1962 | Keller et al. | 338—28 |
| 3,064,222 | 11/1962 | Renier | 338—25 |
| 3,089,339 | 5/1963 | Rogers et al. | 338—26 |
| 3,201,736 | 8/1965 | Ovshinsky | 338—25 |
| 3,271,584 | 9/1966 | Ovshinsky | 338—25 |

RICHARD M. WOOD, *Primary Examiner.*

W. D. BROOKS, *Assistant Examiner.*